US012610041B2

(12) United States Patent
Zhao et al.

(10) Patent No.:  US 12,610,041 B2
(45) Date of Patent:       Apr. 21, 2026

(54) SYSTEMS AND METHODS FOR CHROMA MODE CODING IN RECURSIVE INTRA/INTER REGION

(71) Applicant: Tencent America LLC, Palo Alto, CA (US)

(72) Inventors: Liang Zhao, Palo Alto, CA (US); Xin Zhao, Palo Alto, CA (US); Jing Ye, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 49 days.

(21) Appl. No.: 18/633,372

(22) Filed: Apr. 11, 2024

(65) Prior Publication Data

US 2025/0175595 A1      May 29, 2025

Related U.S. Application Data

(60) Provisional application No. 63/604,038, filed on Nov. 29, 2023.

(51) Int. Cl.
| | |
|---|---|
| *H04N 19/11* | (2014.01) |
| *H04N 19/105* | (2014.01) |
| *H04N 19/107* | (2014.01) |
| *H04N 19/139* | (2014.01) |
| *H04N 19/176* | (2014.01) |

(Continued)

(52) U.S. Cl.
CPC ........... *H04N 19/11* (2014.11); *H04N 19/105* (2014.11); *H04N 19/107* (2014.11); *H04N*

*19/139* (2014.11); *H04N 19/176* (2014.11); *H04N 19/186* (2014.11); *H04N 19/70* (2014.11)

(58) Field of Classification Search
CPC .... H04N 19/11; H04N 19/105; H04N 19/107; H04N 19/139; H04N 19/176; H04N 19/186; H04N 19/70
See application file for complete search history.

(56) References Cited

U.S. PATENT DOCUMENTS

| | | |
|---|---|---|
| 2014/0226720 A1 | 8/2014 | Park |
| 2016/0057430 A1 | 2/2016 | Kolesnikov et al. |

(Continued)

OTHER PUBLICATIONS

Peter de Rivaz et al., "AVI Bitstream & Decoding Process Specification", Version 1.0.0 with Errata 1, The Alliance for Open Media, Jan. 2019, 681 pgs.

(Continued)

*Primary Examiner* — Francis Geroleo

(74) *Attorney, Agent, or Firm* — Morgan, Lewis & Bockius LLP

(57) ABSTRACT

An example method of video coding includes receiving a video bitstream including a plurality of blocks; identifying, based on a first indicator in the video bitstream, a coding region that includes two or more blocks of the plurality of blocks, where each block in the coding region is encoded in an intra prediction mode. The method further includes identifying, for a chroma block in the coding region, an angular intra prediction mode of a collocated luma block; and reconstructing the two or more blocks of the coding region using the angular intra prediction mode of the collocated luma block as a reference for the chroma block.

20 Claims, 7 Drawing Sheets

(51) Int. Cl.
H04N 19/186 (2014.01)
H04N 19/70 (2014.01)

(56) References Cited

U.S. PATENT DOCUMENTS

| | | | |
|---|---|---|---|
| 2018/0192076 A1 | 7/2018 | Ikai et al. | |
| 2018/0288446 A1* | 10/2018 | An | H04N 19/159 |
| 2019/0306518 A1 | 10/2019 | Oh et al. | |
| 2020/0021811 A1 | 1/2020 | Nguyen et al. | |
| 2021/0037242 A1* | 2/2021 | Zhao | H04N 19/132 |
| 2021/0084306 A1 | 3/2021 | Sasai et al. | |
| 2021/0235079 A1 | 7/2021 | Chuang et al. | |
| 2022/0038692 A1 | 2/2022 | Ko et al. | |
| 2022/0046255 A1 | 2/2022 | Zhu et al. | |
| 2022/0070483 A1 | 3/2022 | Liu et al. | |
| 2022/0094958 A1 | 3/2022 | Kim et al. | |
| 2022/0248009 A1 | 8/2022 | Xu et al. | |
| 2022/0279169 A1* | 9/2022 | Deng | H04N 19/1883 |
| 2023/0269372 A1* | 8/2023 | Lim | H04N 19/1883 |
| | | | 375/240.02 |

OTHER PUBLICATIONS

Urvang Joshi et al., "Uneven 4-Way Partitions", Alliance for Open Media, Codec Working Group, Document: CWG-D035_v2, Google LLC, Jun. 2023,9 pgs.

Yue Chen et al., "Extended Recursive Partitions (Amendment 1)", Alliance for Open Media, Codec Working Group, Document: CWG-C090, Google LLC, Dec. 2022, 13 pgs.

Tencent America LLC, ISRWO, PCT/US2024/025262, Aug. 2, 2024, 7 pgs.

Tencent America LLC, ISRWO, PCT/US2024/025263, Aug. 12, 2024, 10 pgs.

Tencent America LLC, ISRWO, PCT/US2024/025266, Aug. 12, 2024, 9 pgs.

Tencent America LLC, ISRWO, PCT/US2024/025268, Aug. 7, 2024, 9 pgs.

Tencent America LLC, ISRWO, PCT/US2024/025269, Aug. 7, 2024, 10 pgs.

Yu-Wen Huang et al., "Block Partitioning Structure in the VVC Standard", IEEE Transactions on Circuits and Systems for Video Technology, vol. 31, Iss. 10, Jun. 2021, 16 pgs.

* cited by examiner

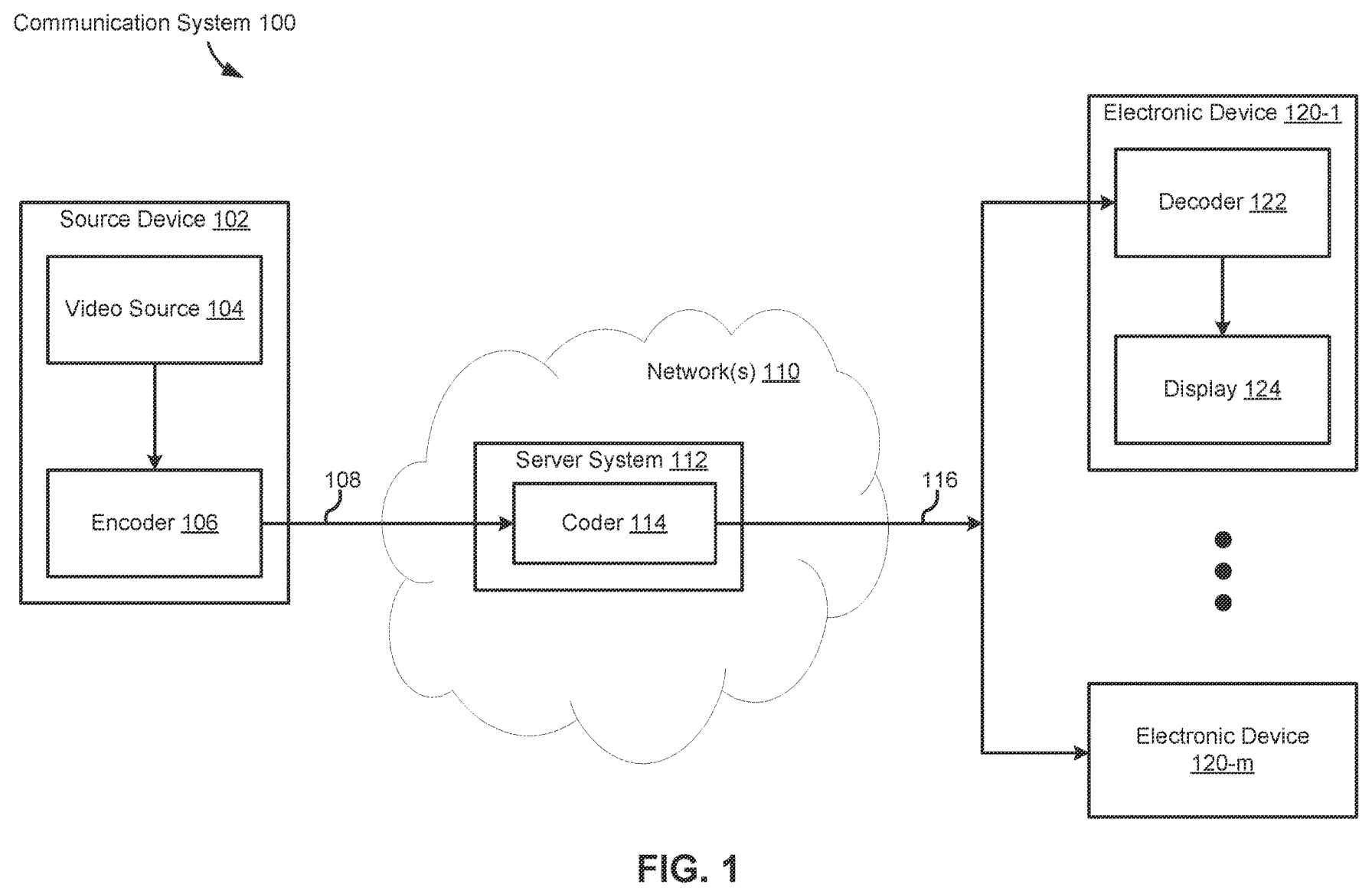

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

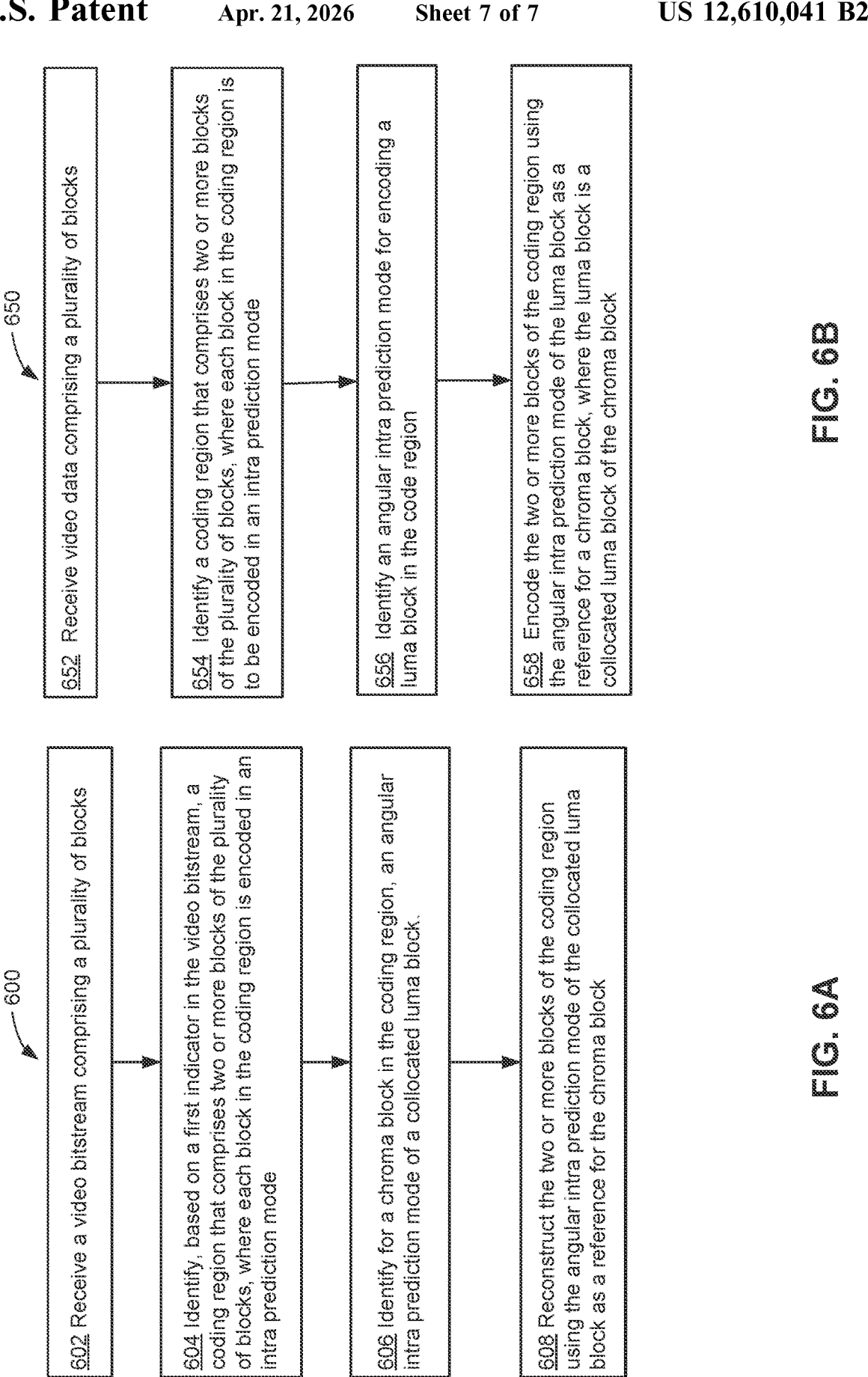

650

652   Receive video data comprising a plurality of blocks

654   Identify a coding region that comprises two or more blocks of the plurality of blocks, where each block in the coding region is to be encoded in an intra prediction mode 656   Identify an angular intra prediction mode for encoding a luma block in the code region 658   Encode the two or more blocks of the coding region using the angular intra prediction mode of the luma block as a reference for a chroma block, where the luma block is a collocated luma block of the chroma block

602   Receive a video bitstream comprising a plurality of blocks

604   Identify, based on a first indicator in the video bitstream, a coding region that comprises two or more blocks of the plurality of blocks, where each block in the coding region is encoded in an intra prediction mode 606   Identify for a chroma block in the coding region, an angular intra prediction mode of a collocated luma block.

608   Reconstruct the two or more blocks of the coding region using the angular intra prediction mode of the collocated luma block as a reference for the chroma block

FIG. 6A

SYSTEMS AND METHODS FOR CHROMA MODE CODING IN RECURSIVE INTRA/INTER REGION

RELATED APPLICATIONS

This application claims priority to U.S. Provisional Patent Application No. 63/604,038, entitled "Chroma Mode Coding in Recursive Intra/Inter Region" filed Nov. 29, 2023, which is hereby incorporated by reference in its entirety.

TECHNICAL FIELD

The disclosed embodiments relate generally to video coding, including but not limited to systems and methods for block partitioning and mode signaling.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to block partitioning and using information from one or more collocated luma blocks as a reference (or prediction) for coding chroma blocks. Some embodiments include using an angular intra prediction mode from a collocated luma block as the reference (or prediction) for coding the intra prediction mode of the chroma block. An advantage of using information from the one or more collocated luma blocks is to improve the quality (e.g., the accuracy and/or precision) of the video encoding/decoding. For example, accuracy of the coding may be improved by using information from one or more regions of the collocated luma blocks to encode/decode a chroma block.

In accordance with some embodiments, a method of video decoding is provided. The method includes (i) receiving a video bitstream comprising a plurality of blocks; (ii) identifying, based on a first indicator in the video bitstream, a coding region that comprises two or more blocks of the plurality of blocks, where each block in the coding region is encoded in an intra prediction mode; (iii) identifying, for a chroma block in the coding region, an angular intra prediction mode of a collocated luma block; and (iv) reconstructing the two or more blocks of the coding region using the angular intra prediction mode of the collocated luma block as a reference for the chroma block.

In accordance with some embodiments, a method of video encoding includes (i) receiving video data comprising a plurality of blocks; (ii) identifying a coding region that comprises two or more blocks of the plurality of blocks, where each block in the coding region is to be encoded in an intra prediction mode; (iii) identifying an angular intra prediction mode for encoding a luma block in the code region; and (iv) encoding the two or more blocks of the coding region using the angular intra prediction mode of the luma block as a reference for a chroma block, where the luma block is a collocated luma block of the chroma block.

In accordance with some embodiments, a method of processing visual media data includes: (i) obtaining a source video sequence that includes a plurality of frames; and (ii) performing a conversion between the source video sequence and a video bitstream of visual media data, where the bitstream comprises: (a) a plurality of encoded blocks corresponding to the plurality of frames; and (b) identification of a coding region of a frame of the plurality of frames, where each block in the coding region is encoded in an intra prediction mode; and where the video bitstream includes encoded information comprising a respective angular intra prediction mode for a respective luma block in the coding region.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
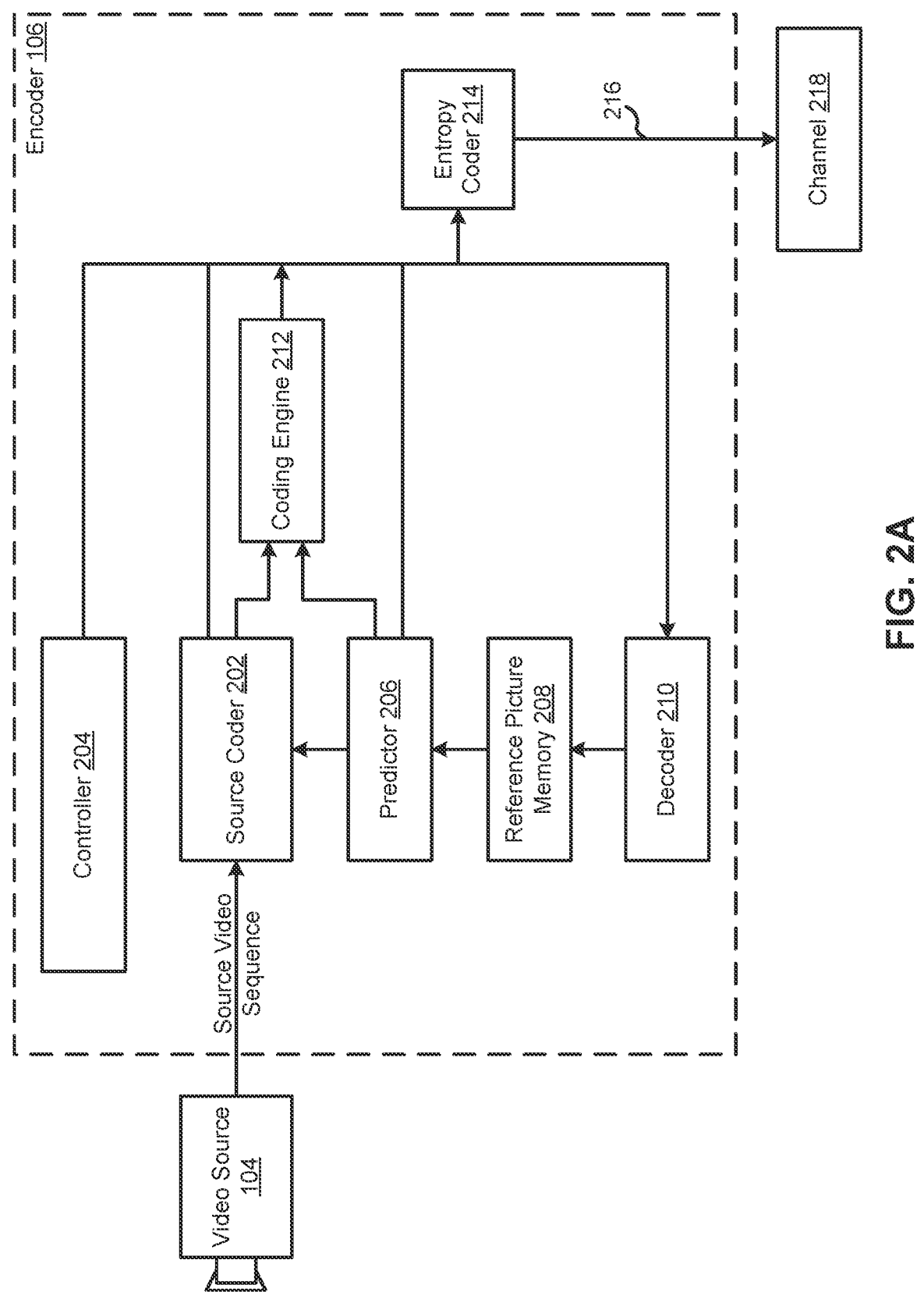
FIG. 2A is a block diagram illustrating example elements of an encoder component in accordance with some embodiments.

The present disclosure describes, amongst other things, using information from one or more collocated luma blocks as a reference (or prediction) for coding chroma blocks. When splitting (e.g., recursively, or using a predefined splitting pattern) a block into one or multiple of equal size or smaller size subblocks, a flag may be signaled to indicate whether all the subblocks within the current block are coded with a first predefined prediction mode or not. The first predefined prediction mode can be an intra coding mode, an inter coding mode, and/or a mixture of intra and inter coding mode. For example, if a non-leaf partitioning tree node is coded as intra region, intra prediction modes of one or multiple co-located luma blocks in the intra region can be used as reference for coding the chroma intra prediction mode. An advantage of using information from the one or more collocated luma blocks is to improve accuracy of the encoding/decoding process.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices"

or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
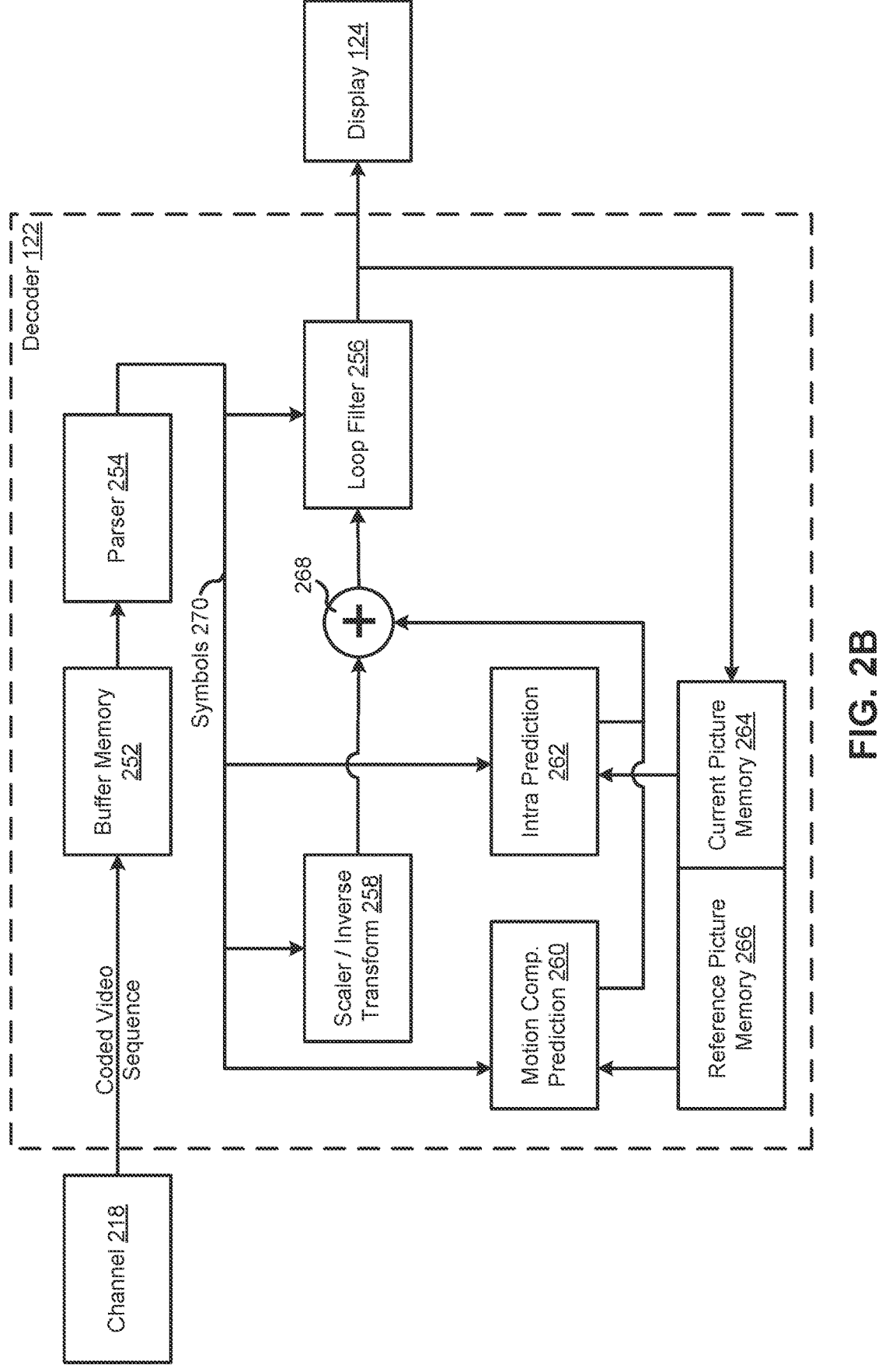
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation can include interpolation of sample values (e.g., as fetched from the reference picture memory 266) when sub-sample exact MVs are in use, MV prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
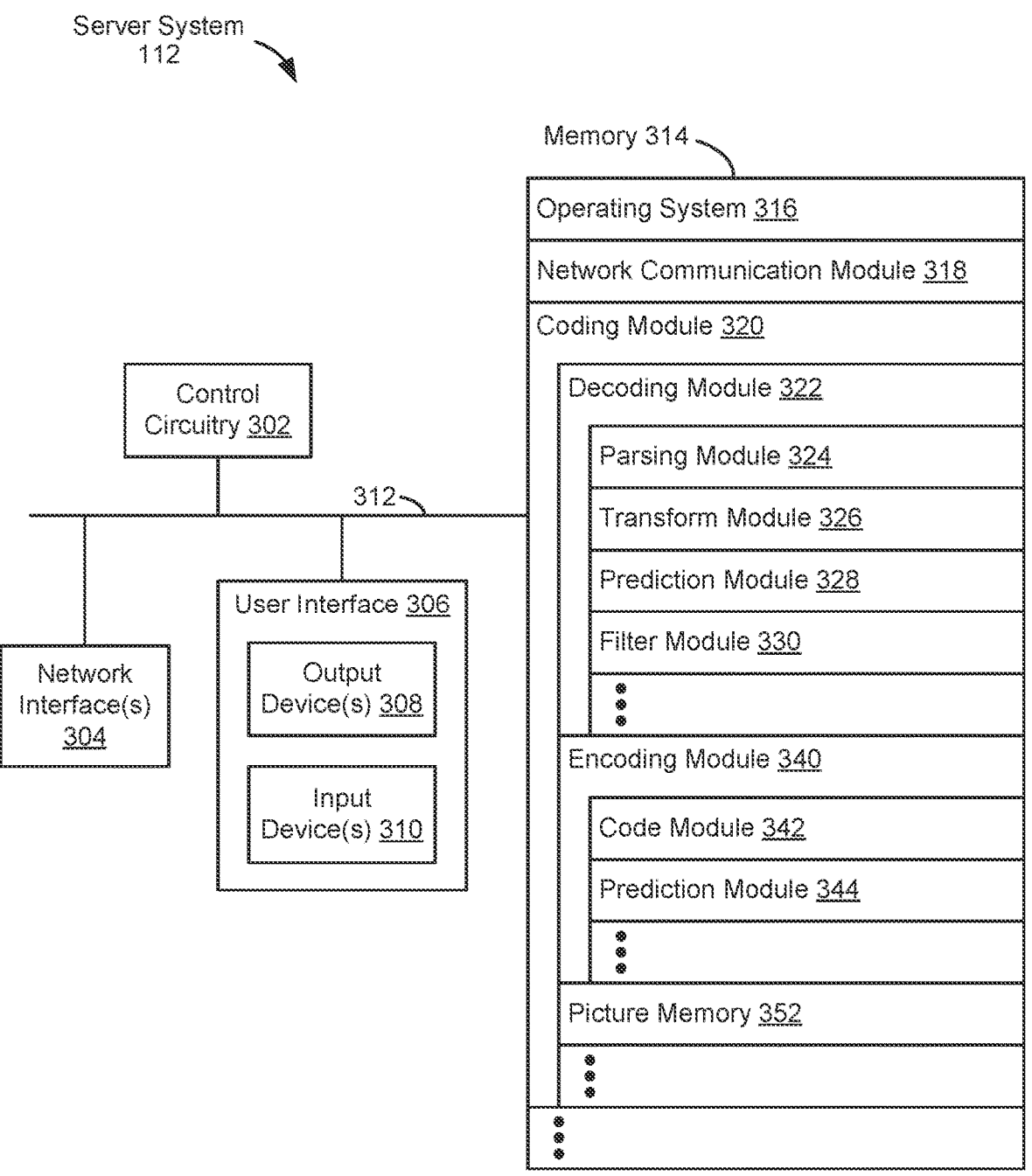
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s) (FPGAs), hardware accelerator(s), and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Technique

The coding processes and techniques described below may be performed at the devices and systems described above (e.g., the source device 102, the server system 112, and/or the electronic device 120). In the following, a block (or subblock) refers to the coding block with the coding block size (such as super block, or largest coding unit, or coding tree block), a prediction block, a transform block, or a filtering unit. For example, a subblock of a block A refers to a block whose area is fully contained in the block A. A block region refers to a specific block area which contains one or more blocks. A block size group refers to the group to which the current block belongs. Blocks of multiple sizes may belong to a single group. A block size group is a collection of multiple block sizes, e.g., multiple block sizes that are similar to each other (e.g., in terms of number of samples, or difference between width and/or height) may be assigned as a block size group.

Turning to block partitioning for coding and decoding, general partitioning may start from a base block (e.g., a superblock or root node) and may follow a predefined ruleset, partition structure, and/or scheme. The partitioning may be hierarchical and/or recursive. After dividing or partitioning a base block using any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB), such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The hierarchical structure of for all color channels may be collectively referred to as coding tree unit (CTU). The partitioning patterns or structures for the various color channels in a CTU may or may not be the same.

In some embodiments, either intra coding or inter coding is allowed in different portions of a particular coding region of a frame. Specifically, either intra coding or inter coding may be allowed in different portions of a frame specified as an inter-prediction frame. In some embodiments, if intra-inter prediction mode is permitted, either intra coding, or inter coding, or intra-inter coding is allowed in different portions of a particular coding region of a frame (e.g., an inter coded frame). In particular, a portion or an entirety of a region of a frame or picture or slice at various partitioning levels (e.g., various recursive partitioning levels) may be coded in either inter prediction mode or intra prediction mode, or when intra-inter prediction is permitted, in either inter prediction mode, or intra prediction mode, or intra-inter prediction mode. An intra-inter coding/prediction mode refers to a coding mode that generates a prediction block using both intra and inter prediction methods. An example intra-inter coding mode derives the prediction block as a (weighted) sum of an intra prediction block and an inter prediction block.

A region, or coding region, may be used to refer to any level in any one of the partitioning schemes described above or in other partitioning schemes not specifically described above. A region therefore may be a frame, a slice, a super block, a macroblock, a subblock, a prediction block, and the like. For example, a region may be any partitioning level of a recursive partitioning scheme. A region may be at a leaf level or non-leaf level of a particular partitioning scheme. A leaf level region is a region not further partitioned. A non-leaf level region, on the other hand, is further partitioned into at least two child regions, each of which may be at a leaf level or may be at a non-leaf level and thus may be further partitioned. A leaf level region is predicted in whole using a particular prediction mode. For example, a leaf-level region may be either inter coded or intra coded. Optionally, a leaf level region may additionally be intra-inter coded if intra-inter prediction mode is permitted.

In some embodiments, when splitting a region into one or multiple sub-regions, at least one flag or syntax element is included in the bitstream by an encoder (and subsequently received, parsed, and decoded by a decoder) to indicate whether all the child regions in the region are all coded with a pre-defined prediction mode. Such a flag may be referred to as a region type flag or a regional prediction mode flag syntax element at various regional signaling levels. The partitioning scheme, for example, may be a recursive partitioning scheme, and at least one such flag may be included in the bitstream by an encoder to indicate whether all child regions within this region are coded with the pre-defined prediction mode.

When all coding blocks of a region at a particular partitioning level are either all coded in the predefined prediction mode (e.g., all intra coded, all inter coded, or all intra-inter coded), then an overall regional prediction mode flag as described above may be included at the region level in the bitstream for such indication, thereby removing the necessity of including such indicators or flags at lower partitioning levels, and further removing the necessity of the normal signaling of a prediction mode at the leaf level. Signaling overhead may thus be reduced.

Figures 4A, 4B, 4C:
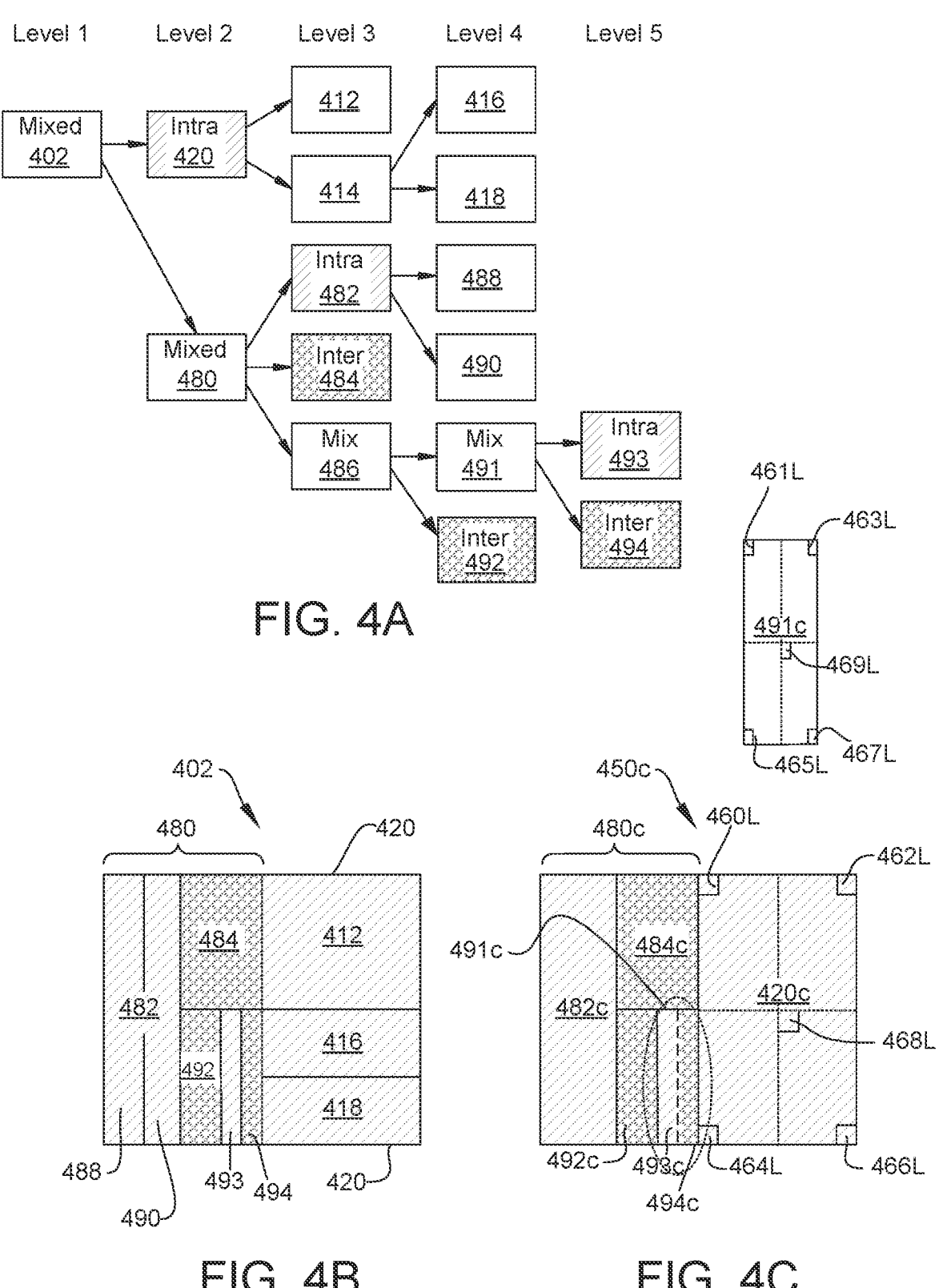
FIGS. 4A, 4B, and 4C illustrate examples of partitioning of coding blocks into regions in accordance with some embodiments.

FIG. 4A-4C illustrate an example of using an angular intra prediction mode of a collocated luma block as a reference for a chroma block. FIG. 4A shows, as an example partitioning scheme, a top region 402 (e.g., a superblock) that is partitioned into regions or blocks at five levels or depths labeled as level 1 through level 5. Leaf level regions (sometimes also called leaf partitioning tree nodes) include regions 412, 416, 418, 488, 490, 492, 493 and 494. Regions in FIG. 4A that include a label of "mixed," "intra," or "inter" represent regions having a corresponding region type flag. Conversely, the absence of labels in blocks illustrated in FIG. 4A indicates that region type flags are optionally not present, or that the decoder does not need to detect the presence (e.g., skip the parsing) of region type flags for the corresponding child regions or blocks. Optionally, region type flags, such as intra_region_flag, inter_region_flag, mixed_region_flag, intra-inter_region_flag, or other region type flags, are signaled to indicate a type of prediction mode used to encode all blocks within a coding region.

In FIG. 4A, the top region 402 includes a mixed_region-_flag. The presence of mixed_region_flag for top region 402 indicates that one or more first blocks (e.g., a first region) in top region 402 are intra-coded, and one or more second blocks (e.g., a second region) in top region 402 are inter-coded. In this example, top region 402 is partitioned into two regions, region 420, and region 480, which are both partitions at level 2, and at a depth of one from the top region 402. For example, top region 402 is partitioned in accordance with a predetermined partitioning scheme.

The intra_region_flag is present for region 420, indicating that all the blocks within region 420 are intra-coded. The region 420 further partitions into region 412 and region 414. The region 414, a level 3 partition at a depth of two from top region 402, is further partitioned into region 416 and region 418, which are partitions at level 4, and at a depth of three from top region 402. No intra_region_flags may be present for 412, 414, 416 and 418 because they are all partitions of region 420 and have been flagged at region 420 as being intra-coded. As such, the decoding component optionally will not perform any additional determination of intra_region_flags when parsing any partitions below region 420, including regions 412, 414, 416, and 418. Optionally, regions 412, 416, and 418 that are also leaf partitions may not include any other prediction mode indicators as they are intra-coded as indicated by the presence of intra_region-_flags at region 420.

The mixed_region_flag is present for region 480, indicating that one or more first blocks (e.g., a first region) in region 480 are intra-coded, and one or more second blocks (e.g., a second region) in region 410 are inter-coded. The region 480 further partitions into region 482, region 484, and region 486, which are level 3 partitions. The intra_region_flag is present for region 482, indicating that all the blocks within region 482 are intra-coded, and the inter_region_flag is present for region 484, indicating that all blocks within region 484 are inter-coded. Further, region 486 is partitioned into two level 4 regions of region 491 and region 492. The region 492 is an intra region that is also a leaf partition. The region 491 is a mixed coded region that is further partitioned into two regions 493 and 494, both of which are level 5 partitions. The region 493 is an intra region and the region 494 is an inter region. In some embodiments, a flag is used to indicate that a region or block is coded in an intra-inter coding mode. An intra-inter coding mode refers to a coding mode that generates prediction block with both intra and inter predictions.

Optionally, the decoder does not determine whether any region type flags are present for leaf partitions and/or reads a leaf-level prediction mode indicator for the leaf partitions to determine their respective prediction mode. For example, a leaf partition under a region having a mixed_region_flag optionally does not include a region type flag but instead includes a prediction mode indicator for the decoder to determine the prediction mode of the leaf partition. In contrast, because regions 432, 434 are leaf partitions under an inter-coded region, region type flags and prediction mode indicators are optionally not signaled for these regions (e.g., all blocks in 432, 434 are inferred as inter-coded blocks). Similarly, because regions 416 and 418 are leaf partitions under an intra-coded region, region type flags and prediction mode indicators are optionally not signaled for these regions (e.g., all blocks in regions 432 and 434 are inferred as intra-coded blocks), helping to reduce signaling overhead.

FIG. 4B illustrates an example partitioning pattern corresponding to the partition scheme described above with respect to FIG. 4A. For example, top region 402 is split into two equal sized second level regions 420, and 480. The second level region 420 is further horizontally split into two equally sized third level regions 412 and 414. The region 414 is further horizontally split into two equally sized fourth level regions 416 and 418. The second level region 480 is further split into three third level regions 482, 484, and 486 (e.g., illustrated by partition 505 in FIG. 5). The region 482 is further vertically split into two equally sized regions 488 and 490, that are level 4 partitions. The region 486 is further vertically split into two equally sized fourth level regions 491 and 492. The region 491, for example, is further vertically split into two equal sized fifth level regions 493 and 494. In this example, the diagonal line shaded regions 420, 412, 414, 416, 418, 482, 488, 490, 492 and 493 are all intra-coded, whereas the cross-hatched regions 484, 492 and 494 are inter-coded. In this example, the mixed_region_flag for the region 402 may be signaled, optionally with a predefined value to indicate that the region 402 includes both blocks that are intra-coded and blocks that are inter-coded. Similarly, intra_region_flag may be signaled for each of the regions 420, 412, 414, 416, 418, 482, 488, 490 and 493 that are all intra-coded. For the region 420, intra_region_flag is signaled to indicate that all subsequent partitions are all intra coded. Consequently, no further lower level intra_region_flags are included for regions 412, 414, 416, 418, no matter whether they are leaf level partitions or not. This may help to reduce signaling overhead. Further, inter_region_flag may be signaled for each of the regions 484, 492 and 494 that are all inter-coded. For top region 402, and region 410, mixed_region_flag may be used to indicate that some coding bocks are inter-coded while others are intra-coded.

Figure 5:
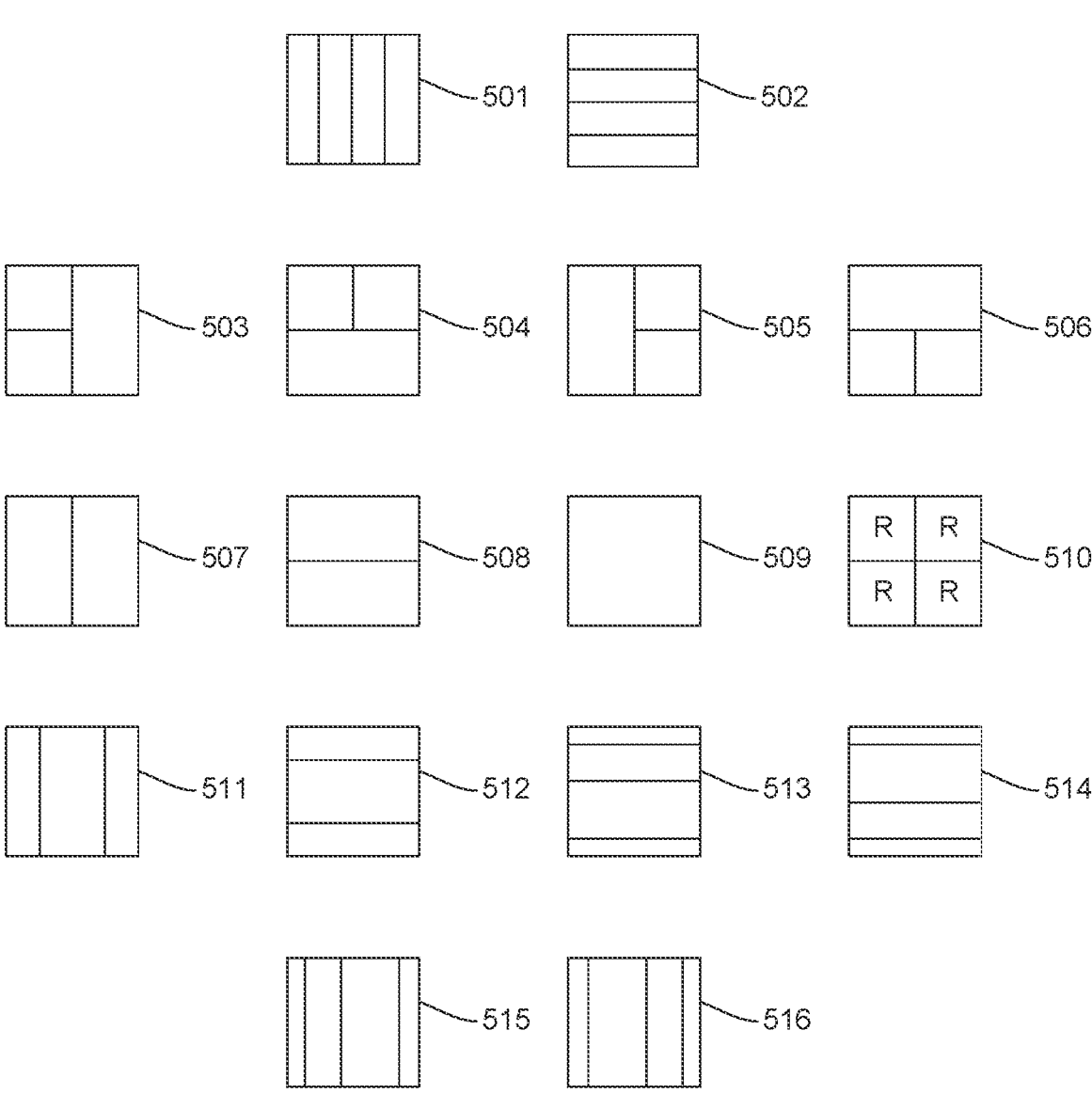
FIG. 5 illustrates different types of coding block partitioning in accordance with some embodiments.

FIG. 5 shows various partition types and partitioning structures in accordance with some embodiments. The partition types and/or structures illustrated in FIG. 5 may be used with the regions and flags described previously with respect to FIGS. 4A and 4B. An example predefined 10-way partitioning structure allows recursive partitioning to form a partitioning tree. The root block may start at a predefined level (e.g., from a base block at 128×128 or 64×64 level). Partitions 501, 502, 503, 504, 505, 506, 507, 508, 509, and 510 shown in FIG. 5 include various 2:1/1:2 and 4:1/1:4 rectangular partitions. The partition type may also include partitions from a ternary partitioning scheme that may be implemented vertically, as shown in partition 511, or horizontally, as shown in partition 512. While the example split ratio in FIG. 5 is shown as 1:2:1 for partitions 511 and 512, other ratios may be used. FIG. 5 also shows partition types that include partitions from an uneven 4-way split/partitioning scheme that may be implemented horizontally, as shown in partitions 513 and 514, or vertically, as shown in partitions 515 and 516. Partition 513 is horizontally split into 1:2:4:1 regions. Partition 514 is horizontally split into 1:4: 2:1 regions. Partition 515 is vertically split with 1:2:4:1 regions. Partition 516 is vertically split with 1:4:2:1 regions.

In some embodiments, for an intra region that is a non-leaf partitioning tree node (optionally partitioned from an inter frame or slice), chroma blocks within the intra region are restricted from further partitioning (e.g., prohibited from further partitioning). In some embodiments, the chroma blocks within the intra region are partitioned with a different block partitioning pattern compared to their respective collocated luma blocks. For example, because region 420 is an intra region, chroma blocks within the region 420 are restricted from further partitioning. Similarly, because region 482 is an intra region, chroma blocks within the region 482 are restricted from further partitioning. Thus, the partitioning illustrated in FIG. 4B for region 402 may refer to the partitioning of luma blocks of region 402 and a corresponding partitioning for the chroma blocks is shown in partitioning 450c of FIG. 4C. No further partitioning of the chroma blocks is allowed in the chroma block of region 420 (420c) because the region 420 is an intra region. In some embodiments, a high-level syntax is signaled into the bitstream (and received at the decoder) to indicate whether the chroma blocks within the intra region (optionally within an inter frame) is to be further split. Thus, instead of always restricting the partitioning of chroma blocks, the high-level syntax provides an option for enabling splitting of chroma blocks. Due to the chroma blocks not being partitioned, a single chroma block can be collocated with multiple luma blocks (e.g., the single chroma block may correspond to multiple merged luma blocks). For example, a single chroma block 420c has luma blocks in regions 412, 414, 416, and 418 as collocated luma blocks. Similarly, a single chroma block 482c has, as collocated luma blocks, luma blocks in regions 488 and 490.

In some embodiments, intra prediction modes of one or multiple collocated luma blocks in the intra region can be used as reference (or prediction) for coding the intra prediction mode of the chroma blocks. Due to the chroma block having multiple collocated luma blocks, the decoder selects which one or more collocated luma blocks are used as a reference (or prediction) for coding the intra prediction mode of the chroma block. In some embodiments, the intra prediction mode of a collocated luma block at a top-left corner (or other three corner positions: top-right, bottom-left and bottom-right, or the center position) in the intra region is used as reference for signaling the chroma intra prediction mode. For example, for the chroma block 420c, the prediction mode of the collocated luma block 460L at a top-left corner, the collocated luma block 462L at the top-right corner, the collocated luma block 464L at the bottom-left corner, and the collocated luma block 466L at the bottom-right corner, or the collocated luma block 468L at the center position is used as a reference for coding a signaled flag of the intra prediction mode of the chroma block 420c.

In some embodiments, luma blocks at more than one position within the intra region are jointly used (e.g., luma blocks at the top-left corner and/or the center position (or any other combinations among the four corner positions and the center position) as reference for signaling the chroma intra prediction mode. For example, for the chroma block 420c, the prediction mode of the collocated luma block 460L at a top-left corner and the collocated luma block 468L at the center position are both used as a reference for coding the signaled flag of the intra prediction mode of the chroma block 420c.

In some embodiments, the intra prediction mode of the collocated luma blocks at the top-left corner (or center position, or other the remaining three corner positions) is first checked. If the prediction mode of the collocated luma block at the top-left corner (or center position, or other the remaining three corner positions) is an angular intra prediction mode, then the angular prediction mode is used as a reference for signaling the chroma intra prediction mode, and the collocated luma block at the remaining candidate positions, (e.g., the center position and the remaining three corner positions) are optionally not checked any more. The angular intra prediction mode is a type of directional intra prediction options that includes a number of directional modes (e.g., 8 based directional modes, arranged at 45° from one another) that may be fine-tuned to include angular steps (e.g., 3 steps clockwise or counter-clockwise, and/or each of 3°). For example, for the chroma block 420c, if the prediction mode of the collocated luma block 460L at the top-left corner is an angular intra prediction mode, then that angular intra prediction mode is used as a reference for signaling the chroma intra prediction mode, and the prediction modes for the collocated luma block 462L at the top-right corner, the collocated luma block 464L at the bottom-left corner, the collocated luma block 466L at the bottom-right corner, and the collocated luma block 468L are not checked further.

In some embodiments, the intra prediction mode of the collocated luma blocks at the top-left corner (or the remaining three corner positions, or the center position) is first checked. If the prediction mode of the collocated luma block at the top-left corner (or center position, or other the remaining three corner positions) is not angular intra prediction mode, then the collocated luma block at the remaining candidate positions, e.g., the remaining three corner positions or the center position are further checked until an angular intra prediction mode is identified, or all candidate positions have been checked. For example, for the chroma block 420c, if the prediction mode of the collocated luma block 460L at the top-left corner is not an angular intra prediction mode, then the prediction modes for the collocated luma block 462L at the top-right corner, the collocated luma block 464L at the bottom-left corner, the collocated luma block 466L at the bottom-right corner, and the collocated luma block 468L are sequentially checked until an angular intra prediction mode is identified or until all five locations have been checked.

In some embodiments, if the block width or height (e.g., optionally block area, a minimum or a maximum of any of block width, block height, or block area) of a child partition for a mixed coded region is equal to or smaller than a size threshold, such as 4, then the chroma component of the mixed coded region is restricted from further partitioning (e.g., prohibited from further splitting), and the prediction mode for the chroma block is derived based on a prediction mode of a luma block at a given position in this intra region, and the prediction mode of the chroma blocks is not signaled into the bitstream. For example, for chroma subsampling of 4:2:0, a single chroma block corresponds to multiple (e.g., at least 2, and for the case of 4:2:0, four luma samples are collocated with a single chroma block) luma blocks. Thus, the area of the single chroma block is equivalent to merging the area of multiple luma blocks. In some embodiments, the given position is the top-left corner or the center position (or other three corner positions) of the luma blocks in the current mixed intra and inter region. For example, region 491 is a mixed coded region that is further partitioned into an intra-coded region 493 and an inter-coded region 494. The regions 493 and 494 are level 5 partitions that have a block width that is equal to or smaller than a size threshold, such as 4. As a result, chroma blocks within the region 493 and region 494 are restricted from further partitioning. For example, the dashed line shown in FIG. 4C indicates that the region 491 is not partitioned (e.g., the chroma block 491c is not partitioned into chroma blocks 493c and 494c). The region 491 is shown enlarged on the top right of FIG. 4C. Thus, a single chroma block 491c is collocated with multiple luma blocks (e.g., the single chroma block may correspond to multiple merged luma blocks). For example, a single chroma block 491c has luma blocks in regions 493 and 494 as collocated luma blocks. In this example, the prediction mode for the chroma block 491c may be derived based on a prediction mode of a luma block at a given position in this intra region. The given position may be a top-left corner. For example, for the chroma block 491c, the prediction mode of the collocated luma block 461L at the top-left corner is used to derive the prediction mode of the chroma block 491c. Alternatively, the prediction mode of the collocated luma block at other positions (e.g., the collocated luma block 463L at the top-right corner, the collocated luma block 465L at the bottom-left corner, and the collocated luma block 467L at the bottom-right corner, or the collocated luma block 469L at the center position) may be used as a reference for coding the intra prediction mode of the chroma block 491c.

In some embodiments, if the block width or height of a child partition for a mixed coded region is equal to or smaller than a size threshold, such as 4, then the chroma component of the mixed coded region is restricted from further partitioning (e.g., prohibited from further splitting), and the prediction mode for the chroma block is derived based on a dominant prediction mode of luma blocks in this intra region, and the prediction mode of the chroma blocks is not signaled into the bitstream. In some embodiments, the dominant prediction mode is determined by the associated block area size of blocks that are coded using the intra prediction mode or coded using the inter prediction mode. For example, for the chroma block 480c, more of the block area is intra-coded (e.g., region 482 and region 493 are intra-coded), which is a larger block area compared to block area that is coded using the inter prediction mode (e.g., region 484, region 492, and region 494) within the mixed region 480. As a result, the intra prediction mode is selected to be the dominant coding mode when the dominant coding mode for region 480 is determined based on block area size.

In some embodiments, the dominant prediction mode is determined by the prediction mode with which most of the luma blocks are coded. For example, for the chroma block 420c, collocated luma blocks 460L, 462L and 466L may be coded using a first angular intra prediction mode (e.g., an angular intra prediction mode at 45°), which is higher than a number of collocated luma block 464L and 468L that is coded using a second angular intra prediction mode (e.g., an angular intra prediction mode at 67.5°) As a result, the first angular intra prediction mode is selected to be the dominant coding mode when the dominant coding mode is determined based on block area size. When a chroma block is collocated with two luma blocks each having a different prediction mode, a default prediction mode may be set as the dominant prediction mode because there may not be a dominant prediction mode between the two luma blocks in that scenario.

In some embodiments, for a chroma block that is coded using the inter prediction mode, the motion vector of the chroma block is set equal to the collocated luma block. If the collocated luma block is coded as intra block, then the motion vector of the inter coded chroma block is set to zero, padded with a motion vector from a set of neighboring blocks, or set to a default motion vector. Such an approach of setting the motion vector does not affect the current block, and is for use in blocks from a future frame, if motion vectors are needed.

In some embodiments, for a chroma block that is coded using the intra-inter prediction mode or the inter prediction mode, the motion vector of the collocated luma block at a given position is used as the motion vector for the chroma block (in the current region).

In some embodiments, if the block width or height of a child partition for a mixed coded region is equal to or smaller than a size threshold, such as 4, then the chroma component of the mixed coded region is restricted from further partitioning (e.g., prohibited from further splitting), and the prediction mode of the chroma blocks is signaled into the bitstream. In some embodiments, one flag is signaled into the bitstream to indicate whether chroma block in this mixed coded region is intra coded or inter coded. In some embodiments, one flag is signaled into the bitstream to indicate whether the prediction mode of chroma block is the same as that of collocated luma block at a given position in this region. In some embodiments, the given position can be top-left corner or center position (or other three corner positions).

In some embodiments, high-level syntaxes (e.g., sequence-level flag, picture-level flag, subpicture-level flag, slice-level flag, tile-level flag, largest block level flag) are signaled and indicate if information from collocated luma blocks are used as a reference (or prediction) for coding the intra prediction mode of the chroma blocks.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of blocks. The system identifies (604), based on a first indicator in the video bitstream, a coding region that comprises two or more blocks of the plurality of blocks, where each block in the coding region is encoded in an intra prediction mode. The system identifies (606) for a chroma block in the coding region, an angular intra prediction mode of a collocated luma block. The system reconstructs (608) the two or more blocks of the coding region using the angular intra prediction mode of the collocated luma block as a reference for the chroma block.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks (e.g., video blocks). The system identifies (654) a coding region that comprises two or more blocks of the plurality of blocks, where each block in the coding region is to be encoded in an intra prediction mode. The system identifies (656) an angular intra prediction mode for encoding a luma block in the code region. The system encodes (658) the two or more blocks of the coding region using the angular intra prediction mode of the luma block as a reference for a chroma block, where the luma block is a collocated luma block of the chroma block. As described previously, the encoding process may mirror the decoding processes described herein (e.g., regarding block partitioning and mode signaling). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream comprising a plurality of blocks; (ii) identifying, based on a first indicator in the video bitstream, a coding region that comprises two or more blocks of the plurality of blocks, where each block in the coding region is encoded in an intra prediction mode; (iii) identifying, for a chroma block in the coding region, an angular intra prediction mode of a collocated luma block; and (iv) reconstructing the two or more blocks of the coding region using the angular intra prediction mode of the collocated luma block as a reference for the chroma block. For example, when recursively splitting a first block into one or multiples of equal size or smaller size sub-blocks, at least one flag, is received at the decoder side to indicate whether all the sub-blocks within this first block are coded with a first pre-defined prediction mode or not. The said first pre-defined prediction mode can be an intra coding mode, and/or an inter coding mode, and/or a mixture of intra and inter coding mode. As an example, if one non-leaf partitioning tree node is coded as intra region in one inter frame/slice, chroma blocks in this intra region is not allowed to further split (or chroma block is partitioned with a different block partitioning pattern compared to its collocated block of luma component), intra prediction modes of one or multiple collocated luma blocks in this intra region can be used as reference (or prediction) for coding the chroma intra prediction mode. In some embodiments, the coding region comprises one or more non-leaf node blocks.

(A2) In some embodiments of A1, the collocated luma block used as a reference for the chroma block is selected from one or more collocated luma blocks positioned at one of four corners or a center position of the coding region. For example, the intra prediction mode of the collocated luma blocks at the top-left corner (or other three corner positions, or the center position) in this intra region is used as reference for signaling the chroma intra prediction mode. As an example, the intra prediction mode of the collocated luma blocks at the top-left corner and/or the center position (or any other combinations among the four corner positions and the center position) in this intra region are both used as reference for signaling the chroma intra prediction mode.

(A3) In some embodiments of A2, identifying the angular intra prediction mode of the collocated luma block for use as the reference for the chroma block includes: sequentially checking one or more collocated luma blocks positioned at one of the four corners or the center position of the coding region; when a respective collocated luma block positioned at one of four corners or a center position of the coding region does not correspond to the angular intra prediction mode, checking subsequent collocated luma blocks positioned at remaining corners of the four corners or the center position; and when a respective collocated luma block positioned at one of four corners or a center position of the block corresponds to the angular intra prediction mode, using the angular intra prediction mode of the respective collocated luma block as the reference for the chroma block; and forgoing checking subsequent collocated luma blocks positioned at the remaining corners of the four corners or the center position. For example, the intra prediction mode of the collocated luma blocks at the top-left corner (or center position, or other the remaining three corner positions) is first checked. If the prediction mode of the collocated luma block at the top-left corner (or center position, or other the remaining three corner positions) is angular intra prediction mode, then this angular prediction is used as reference for signaling chroma intra prediction mode, and the collocated luma block at the remaining candidate positions, e.g., the center positions (the top-left corner, or other three corner positions) are not checked any more. In an example, the intra prediction mode of the collocated luma blocks at the top-left corner (or center position, or other the remaining three corner positions) is first checked. If the prediction mode of the collocated luma block at the top-left corner (or center position, or other the remaining three corner positions) is not angular intra prediction mode, then the collocated luma block at the remaining candidate positions, e.g., the center positions (the top-left corner, or other three corner positions) are further checked until an angular intra prediction mode is identified, or all candidate positions have been checked. In some embodiments, in accordance with a determination that a respective collocated luma block positioned at one of four corners or a center position of the block does not correspond to the angular intra prediction mode, checking subsequent collocated luma blocks positioned at the remaining of the four corners or the center position. In some embodiments, in accordance with a determination that a respective collocated luma block positioned at one of four corners or a center position of the block corresponds to the angular intra prediction mode, using the angular intra prediction mode of the respective collocated luma block as the reference for the chroma block; and forgoing checking subsequent collocated luma blocks positioned at the remaining of the four corners or the center position.

(A4) In some embodiments of any of A1-A3, the method further includes identifying a second coding region that is mixed coded; and when the second coding region has a size that does not meet one or more criteria, restricting partitioning of a chroma block within the second coding region, where a first indicator of a prediction mode of the chroma block within the second coding region is absent from the video bitstream. For example, one non-leaf partitioning tree node is coded as a mixture of intra, inter and/intra-inter coded blocks, and the block width or height of one of its child node is equal to or smaller than one threshold, such as 4, then the chroma component of this intra region is not allowed to further split, and the prediction mode for the chroma blocks is derived based on the luma blocks in this intra region, and the prediction mode of the chroma blocks are not signaled into the bitstream. In some embodiments, in accordance with a determination that the second coding region has a size that does not meet one or more criteria, restricting partitioning of a chroma block within the second coding region.

(A5) In some embodiments of A4, the prediction mode of the chroma block within the second coding region is derived based on a prediction mode of a luma block at a given position within the second coding region. For example, one non-leaf partitioning tree node is coded as a mixture of intra, inter and intra-inter coded blocks, and the block width or height of one of its child node is equal to or smaller than one threshold, such as 4, then the prediction mode for the chroma blocks is derived based on the prediction mode of luma blocks at a given position in this intra region, and the prediction mode of the chroma blocks are not signaled into the bitstream. In an example, the given position is the top-left corner or the center position (or other three corner positions) of the luma blocks in the current mixed intra and inter region.

(A6) In some embodiments of A4 or A5, the prediction mode of the chroma block within the second coding region is derived based on a dominant prediction mode of luma blocks in the second coding region. For example, one non-leaf partitioning tree node is coded as a mixture of intra, inter and intra-inter coded blocks, and the block width or height of one of its child node is equal to or smaller than one threshold, such as 4, then the prediction mode for the chroma blocks is derived based on the dominant prediction mode of luma blocks in this intra region, and the prediction mode of the chroma blocks are not signaled into the bitstream.

(A7) In some embodiments of A6, the dominant prediction mode of the luma blocks in the second coding region is a most frequently used prediction mode for the luma blocks in the second coding region or the dominant prediction mode is a prediction mode having a largest block area size for the luma blocks in the second coding region. For example, the dominant prediction mode is determined by the associated block area size of the coded block with intra or inter coded mode. In one example, if most of the prediction mode for the prediction mode of luma blocks in this intra region is inter coded block.

(A8) In some embodiments of any of A4-A7, the method further includes, when the prediction mode of the chroma block within the second coding region is an inter prediction mode: when the prediction mode of a collocated luma block within the second coding region is the inter prediction mode, matching a motion vector of the chroma block within the second coding region with a motion vector of the collocated luma block within the second coding region; and when the prediction mode of the collocated luma block within the second coding region is the intra prediction mode, setting the motion vector of the chroma block within the second coding region to a predefined value or to match a motion vector of a neighboring block. For example, if the prediction mode of the chroma block is determined as inter-coded block, then the motion vector of the chroma block is the same as that of the collocated luma block. If the collocated luma block is coded as intra block, then the motion vector is set to zero (or padded with the neighboring available motion vector, or set as a default motion vector) for this chroma block. In some embodiments, in accordance with a determination that the prediction mode of a collocated luma block within the second coding region is an inter prediction mode, setting a motion vector of the chroma block within the second coding region to match a motion vector of the collocated luma block within the second coding region. In some embodiments, in accordance with a determination that the prediction mode of the collocated luma block within the second coding region is an intra prediction mode, setting the motion vector of the chroma block within the second coding region to a predefined value or to a motion vector from a neighboring block.

(A9) In some embodiments of any of A4-A8, the method further includes, when the prediction mode of the chroma block within the second coding region is an inter prediction mode or an intra prediction mode: setting a motion vector of the chroma block within the second coding region to match a motion vector of a collocated luma block at a given position in the second coding region. For example, if the prediction mode of the chroma block is determined as intra-inter or inter-coded block, the motion vector of the collocated luma block at one given position is used as the motion vector for the chroma blocks in current region. In some embodiments, in accordance with a determination that the prediction mode of the chroma block within the second coding region is an inter prediction mode or an intra prediction mode: setting a motion vector of the chroma block within the second coding region to match a motion vector of a collocated luma block at a given position in the second coding region.

(A10) In some embodiments of any of A1-A9, the method further includes identifying a second coding region that is mixed coded; when the second coding region has a size that does not meet one or more criteria, receiving, in the video bitstream, a first indicator of a prediction mode of the chroma block within the second coding region and restricting partitioning of a chroma block within the second coding region. For example, one non-leaf partitioning tree node is coded as a mixture of intra and inter coded blocks, and the block width or height of one of its child nodes is equal to or smaller than one threshold, such as 4, then the chroma blocks of this intra region is not allowed to further split. The prediction mode for chroma block may be signaled into the bitstream. In some embodiments, in accordance with a determination that the second coding region has a size that does not meet one or more criteria, partitioning of a chroma block within the second coding region is restricted, and a first indicator of a prediction mode of the chroma block within the second coding region is received in the video bitstream.

(A11) In some embodiments of A10, the second coding region has a size that meets the one or more criteria when a length of the second coding region is equal to or less than a threshold length.

(A12) In some embodiments of A10 or A11, the first indicator indicates whether the chroma block within the second coding region is coded with the intra prediction mode, an inter prediction mode, or is encoded in a same prediction mode as a collocated luma block at a given position. For example, one flag is signaled into the bitstream to indicate whether chroma block in this mixed intra and inter region is intra coded or inter coded. In an example, one flag is signaled into the bitstream to indicate whether the prediction mode of chroma block is the same as that of co-luma block at a given position in this region or not. In such an example, the given position can be top-left corner or center position (or other three corner positions).

(A13) In some embodiments of any of A1-A12, the method further includes: receiving in the video bitstream, one or more high-level syntaxes indicating a usage of the angular intra prediction mode of the collocated luma block as a reference for the chroma block. For example, the usage and/or enabling of the features is controlled by high-level syntaxes, including but not limited sequence-level flag, picture-level flag, subpicture-level flag, slice-level flag, tile-level flag, largest block level flag.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data comprising a plurality of blocks; (ii) identifying a coding region that comprises two or more blocks of the plurality of blocks, where each block in the coding region is to be encoded in an intra prediction mode; (iii) identifying an angular intra prediction mode for encoding a luma block in the code region; and (iv) encoding the two or more blocks of the coding region using the angular intra prediction mode of the luma block as a reference for a chroma block, where the luma block is a collocated luma block of the chroma block.

(B2) In some embodiments of B1, the one or more sets of instructions further comprise instructions for: identifying a second coding region that is to be mixed encoded, and when the second coding region has a size that does not meet one or more criteria, forgoing signaling an indication of a prediction mode of a chroma block in the second coding region.

(B3) In some embodiments of B2, the one or more sets of instructions further comprise instructions for, when a prediction mode of the chroma block within the second coding region is an inter prediction mode: when the prediction mode of a collocated luma block within the second coding region is the inter prediction mode, matching a motion vector of the chroma block within the second coding region with a motion vector of the collocated luma block within the second coding region; and when the prediction mode of the collocated luma block within the second coding region is the intra prediction mode, setting the motion vector of the chroma block within the second coding region to a predefined value or to match a motion vector of a neighboring block.

(B4) In some embodiments of any of B1-B3, the one or more sets of instructions further comprise instructions for, when a prediction mode of the chroma block within the second coding region is an inter prediction mode or an intra prediction mode: matching a motion vector of the chroma block within the second coding region with a motion vector of a collocated luma block at a given position in the second coding region.

(B5) In some embodiments of any of B1-B4, the one or more sets of instructions further comprise instructions for identifying a second coding region that is to be mixed encoded and signaling an indication of a prediction mode for a chroma block within the second coding region.

(B6) In some embodiments of any of B5, the indication indicates that the chroma block is to be encoded with the intra prediction mode, an inter prediction mode, or is to be encoded in a same prediction mode as a collocated luma block at a given position.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data, where the video bitstream includes: (a) a plurality of encoded blocks corresponding to the plurality of frames; and (b) identification of a coding region of a frame of the plurality of frames, where each block in the coding region is encoded in an intra prediction mode; and where the video bitstream includes encoded information comprising a respective angular intra prediction mode for a respective luma block in the coding region.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13, B1-B6, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A13, B1-B6, and C1 above above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
receiving a video bitstream comprising a plurality of blocks, and
identifying, based on a first indicator in the video bitstream, a coding region that comprises two or more blocks of the plurality of blocks, wherein each block in the coding region is encoded in an intra prediction mode;
identifying, for a chroma block in the coding region, an angular intra prediction mode of a collocated luma block;
reconstructing the two or more blocks of the coding region using the angular intra prediction mode of the collocated luma block as a reference for the chroma block;
identifying a second coding region that is mixed coded; and
when the second coding region has a size that does not meet one or more criteria, restricting partitioning of a second chroma block within the second coding region, wherein a second indicator of a prediction mode of the second chroma block within the second coding region is absent from the video bitstream.

2. The method of claim 1, wherein the collocated luma block used as a reference for the chroma block is selected from one or more collocated luma blocks positioned at one of four corners or a center position of the coding region.

3. The method of claim 2, wherein identifying the angular intra prediction mode of the collocated luma block for use as the reference for the chroma block includes:
sequentially checking one or more collocated luma blocks positioned at one of the four corners or the center position of the coding region;
when a respective collocated luma block positioned at one of the four corners or the center position of the coding region does not correspond to the angular intra prediction mode, checking subsequent collocated luma blocks positioned at remaining corners of the four corners or the center position; and
when the respective collocated luma block positioned at one of the four corners or the center position of the coding region corresponds to the angular intra prediction mode, using the angular intra prediction mode of the respective collocated luma block as the reference for the chroma block; and forgoing checking the subsequent collocated luma blocks positioned at the remaining corners of the four corners or the center position.

4. The method of claim 1, wherein the prediction mode of the chroma block within the second coding region is derived based on a prediction mode of a luma block at a given position within the second coding region.

5. The method of claim 1, wherein the prediction mode of the chroma block within the second coding region is derived based on a dominant prediction mode of luma blocks in the second coding region.

6. The method of claim 5, wherein the dominant prediction mode of the luma blocks in the second coding region is a most frequently used prediction mode for the luma blocks in the second coding region or the dominant prediction mode is a prediction mode having a largest block area size for the luma blocks in the second coding region.

7. The method of claim 1, including:
when the prediction mode of the chroma block within the second coding region is an inter prediction mode:
when the prediction mode of a collocated luma block within the second coding region is the inter prediction mode, matching a motion vector of the chroma block within the second coding region with a motion vector of the collocated luma block within the second coding region; and
when the prediction mode of the collocated luma block within the second coding region is the intra prediction mode, setting the motion vector of the chroma block within the second coding region to a predefined value or to match a motion vector of a neighboring block.

8. The method of claim 1, including:
when the prediction mode of the chroma block within the second coding region is an inter prediction mode or an intra prediction mode:
setting a motion vector of the chroma block within the second coding region to match a motion vector of a collocated luma block at a given position in the second coding region.

9. The method of claim 1, further comprising:
when the second coding region has a size that does not meet one or more criteria, receiving, in the video bitstream, the second indicator of a prediction mode of the chroma block within the second coding region and restricting partitioning of the second chroma block within the second coding region.

10. The method of claim 9, wherein the second coding region has a size that meets the one or more criteria when a length of the second coding region is equal to or less than a threshold length.

11. The method of claim 9, wherein the second indicator indicates whether the chroma block within the second coding region is coded with the intra prediction mode, an inter prediction mode, or is encoded in a same prediction mode as a collocated luma block at a given position.

12. The method of claim 1, further comprising:
receiving in the video bitstream, one or more high-level syntaxes indicating a usage of the angular intra prediction mode of the collocated luma block as a reference for the chroma block.

13. A computing system, comprising:
control circuitry;
memory; and one or more sets of instructions stored in the memory and configured for execution by the control circuitry, the one or more sets of instructions comprising instructions for:

receiving video data comprising a plurality of blocks;

identifying a coding region that comprises two or more blocks of the plurality of blocks, wherein each block in the coding region is to be encoded in an intra prediction mode;

identifying an angular intra prediction mode for encoding a luma block in the code region;

identifying a second coding region that is to be mixed encoded, and when the second coding region has a size that does not meet one or more criteria, forgoing signaling an indication of a prediction mode of a second chroma block in the second coding region; and encoding the two or more blocks of the coding region using the angular intra prediction mode of the luma block as a reference for a chroma block, wherein the luma block is a collocated luma block of the chroma block.

14. The computing system of claim 13, wherein the one or more sets of instructions further comprise instructions for, when a prediction mode of the chroma block within the second coding region is an inter prediction mode:

when the prediction mode of a collocated luma block within the second coding region is the inter prediction mode, matching a motion vector of the chroma block within the second coding region with a motion vector of the collocated luma block within the second coding region; and when the prediction mode of the collocated luma block within the second coding region is the intra prediction mode, setting the motion vector of the chroma block within the second coding region to a predefined value or to match a motion vector of a neighboring block.

15. The computing system of claim 13, wherein the one or more sets of instructions further comprise instructions for, when a prediction mode of the chroma block within the second coding region is an inter prediction mode or an intra prediction mode:

matching a motion vector of the chroma block within the second coding region with a motion vector of a collocated luma block at a given position in the second coding region.

16. The computing system of claim 13, wherein the one or more sets of instructions further comprise instructions for, when the second coding region has a size that meets one or more criteria, signaling an indication of a prediction mode for the second chroma block within the second coding region.

17. The computing system of claim 16, wherein the indication indicates that the chroma block is to be encoded with the intra prediction mode, an inter prediction mode, or is to be encoded in a same prediction mode as a collocated luma block at a given position.

18. A non-transitory computer-readable storage medium storing a video bitstream that is generated by a video encoding method and one or more instructions, the instructions when executed by a processor, cause a computing system to generate the video bitstream, the video bitstream comprising:

encoded information for a coding region of video data, the encoded information comprising a respective angular intra prediction mode for a respective luma block in the coding region; and wherein the video encoding method comprises:

receiving video data comprising a plurality of blocks;

identifying the coding region that comprises two or more blocks of the plurality of blocks, wherein each block in the coding region is to be encoded in an intra prediction mode;

identifying an angular intra prediction mode for encoding a luma block in the code region;

identifying a second coding region that is to be mixed encoded, and when the second coding region has a size that does not meet one or more criteria, forgoing signaling an indication of a prediction mode of a chroma block in the second coding region; and encoding the two or more blocks of the coding region using the angular intra prediction mode of the luma block as a reference for a chroma block, wherein the luma block is a collocated luma block of the chroma block.

19. The non-transitory computer-readable storage medium of claim 18, wherein, when the second coding region has a size that does not meet one or more criteria, the video bitstream comprises a second indicator of a prediction mode of the chroma block within the second coding region and restricting partitioning of the second chroma block within the second coding region.

20. The non-transitory computer-readable storage medium of claim 19, wherein the second indicator indicates whether the chroma block within the second coding region is coded with the intra prediction mode, an inter prediction mode, or is encoded in a same prediction mode as a collocated luma block at a given position.

* * * * *